Nov. 7, 1967     L. W. GATES     3,351,399
SEAL FOR FLANGE-SUPPORTED BEARINGS
Filed Dec. 27, 1965
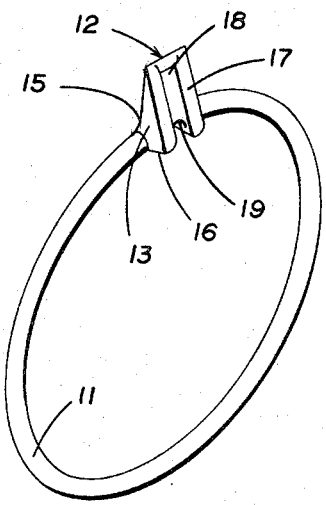
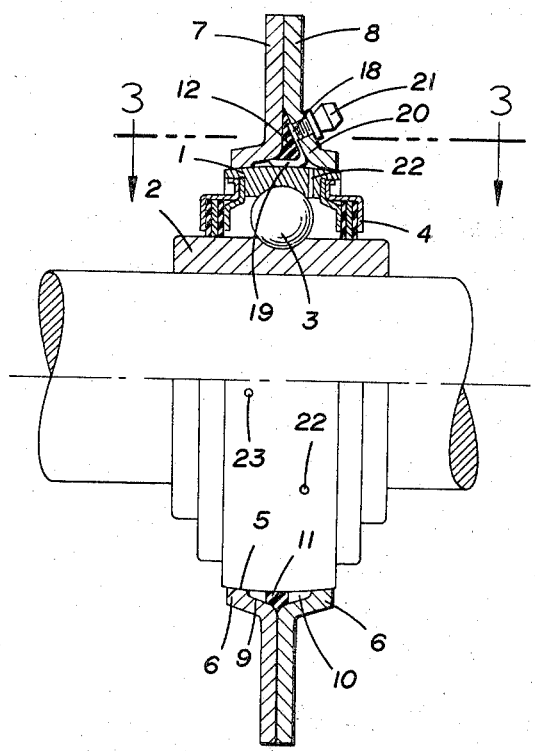
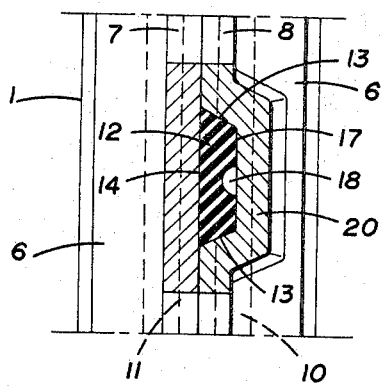
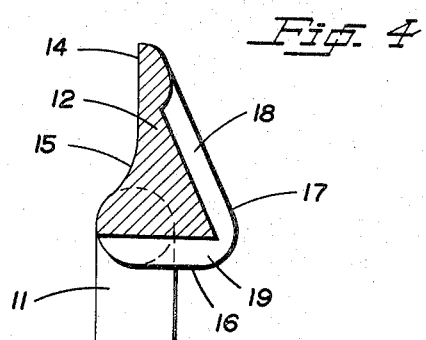
INVENTOR.
Lauren W. Gates
BY
*Webster & Webster*
ATTORNEYS

United States Patent Office 3,351,399
Patented Nov. 7, 1967

3,351,399
SEAL FOR FLANGE-SUPPORTED BEARINGS
Lauren W. Gates, Stockton, Calif., assignor to Blackwelder Manufacturing Company, Rio Vista, Calif., a corporation of California
Filed Dec. 27, 1965, Ser. No. 516,426
5 Claims. (Cl. 308—187)

ABSTRACT OF THE DISCLOSURE

In association with a ball bearing confined between abutting mounting plates and supporting flanges, and a pressure lubricant supply fitting mounted in one flange to feed lubricant to the bearing; a seal between the outer race of the bearing and the flanges to prevent lubricant as issuing under pressure from the fitting from tending to spread said plates.

---

In such a bearing—of flange-supported type—the outer race is curved on the outer surface so that the bearing can swivel in its supporting and mounting member. This, of course, normally requires that said member comprise two initially separate supporting flanges projecting laterally outward from the inner edges of corresponding radial mounting plates which—after said flanges are engaged with the outer race from opposite ends thereof—are abutted face to face and secured together at circumferentially spaced points.

As high pressure is employed to feed lubricant into the bearing, a problem has heretofore existed in that such pressure had a tendency to spread the mounting plates sufficient to permit bleeding of some of the lubricant from between said plates.

It is, therefore, the major object of this invention to provide a novel seal (adapted to be disposed between the outer race of a bearing and the supporting flanges) which will permit the lubricant to be fed under high pressure into the bearing without spreading the mounting plates and hence preventing bleeding of the lubricant therebetween.

A further object of the invention is to provide a seal for flange-supported bearings which is designed for ease and economy of manufacture, and ready installation upon assembly of such bearings.

A still further object of the invention is to provide a practical, reliable, and durable seal for flange-supported bearings and one which is exceedingly effective for the purpose for which it is designed.

These objects are accomplished by means of such structure and relative arrangement of parts as will fully appear by a perusal of the following specification and claims.

In the drawings:

FIG. 1 is a perspective view of the improved seal, detached.

FIG. 2 is a diametral elevation, mainly in section, of a bearing as mounted in place and provided with the improved seal.

FIG. 3 is an enlarged fragmentary sectional plan view taken on line 3—3 of FIG. 2.

FIG. 4 is an enlarged sectional elevation of the sealing lug of the O-ring.

Referring now more particularly to the drawings and to the characters of reference marked thereon, the bearing—which receives the seal—is self-alining and includes outer and inner races 1 and 2, respectively, between which the anti-friction bearing member 3 (such as balls) are disposed. The balls are maintained in sealed relation between the races 1 and 2 by conventional seals 4 disposed to the sides of the balls and mounted on one race for engagement by the other race; the race 2 being, of course, shaft-supported.

The outer race 1 is formed with a transverse convex curvature on the outer surface as shown at 5; such curved surface being closely engaged by the outermost portions of laterally outwardly projecting, circumferentially extending supporting flanges 6 which are integral with the inner edges of radially outwardly projecting mounting plates 7 and 8. Such mounting plates are suitably clamped together in face-to-face relation at spaced points in their extent. By means of this arrangement, the bearing is prevented from moving axially relative to the mounting plates 7 and 8, but can swivel in the flanges 6 so as to be self-alining.

The flanges 6 are formed so that their inner ends and adjacent inner faces 9 are spaced from the outer face of the race 1 to provide a circumferential cavity or recess 10 for the reception centrally therein of an O-type sealing ring 11.

When in place centrally in the cavity 10, the O-ring (which is of elastic and deformable material such as rubber) is under compression between the outer race 1 and the flanges 6 at the juncture of the latter with the plates 7 and 8 whereby to effectively seal the abutting faces of such plates against entry therebetween of lubricant from said cavity 10.

In order to feed lubricant into the cavity 10 on both sides of the O-ring, and therefrom into the space between the races 1 and 2, the following arrangement is provided.

At one point in its circumferential extent, the O-ring is formed with an outwardly projecting lubricant receiving lug or ear 12; the side edges 13 of said lug converging upwardly as well as outwardly at a slight angle.

The back face 14 of the lug 12 is flat and straight except adjacent its connection with the O-ring where said face is curved, as at 15, to follow the contour of and bear against the adjacent portion of the cavity 10. The straight portion of said back face 14 lies in the central transverse plane of the O-ring so as to aline with and bear against the adjacent face of the plate 7; the abutting faces of the plates 7 and 8 lying in the central transverse plane of the bearing.

The lug 12 (in the form here shown) is triangular in section with its base 16 tangential to the radially inner edge of the O-ring and thus resting on the adjacent portion of the curved surface of the race 1. The front face 17 of the lug 12 slopes laterally inward from the free edge of the base 16 to the outer end of the back face 14.

In the front face 17 the lug 12 is formed with a groove 18 which extends radially of the ring from a point short of the outer end or apex of the lug to the base 16. The base 16 is formed with a transverse groove 19 disposed centrally between the side edges 13 of the lug and extending for the full width thereof so that at one end said groove 19 communicates with the inner end of the radial groove 18 and at the other end communicates with the cavity 10 at a point on the opposite side of the ring 11.

The plate 8 and the corresponding flange 6 are deformed to provide a matching housing 20 for reception of the lug 12; the walls of said housing closely or tightly engaging the front face 17 and side edges 13 of the lug whereby, in effect, to seal the lug in place while leaving the grooves 18 and 19 unobstructed. The back face 14 of the lug seals, of coarse, against the plate 7.

A lubricant fitting 21 is mounted in the outer wall of the housing 20 in position to communicate with the groove 18; the latter being open at its inner end to the cavity 10 on one side of the O-ring and—as previously described—also communicating with the adjacent end of the transverse groove 19 to provide communication with the cavity on the other side of said O-ring.

Passages 22 are drilled through the outer race 1 at spaced points thereabout and to one side of the bearing members 3 whereby to provide communication between the corresponding portion of the cavity 10 and the space between the races. Similar passages 23 are also drilled through the race 1 on the opposite side of the bearing members 3. It is to be noted that the O-ring (in place and under compression) does not completely fill the cavity 10 and leaves the side portions of said cavity open and in communication with the passages 22 and 23.

From the fitting 21 and as pressure-fed lubricant passes through the groove 18 into the cavity 10 on one side of the O-ring 11, through groove 19 to the cavity on the other side of said O-ring, and from both sides of said cavity through passages 22 and 23; all without disturbing the sealing effect of such O-ring.

Thus, by reason of the described seal, lubricant may be fed under high pressure into the space between the races 1 and 2 (on both sides of the bearing members 3) but without gaining entry between and spreading the plates 7 and 8 by reason of such pressure.

From the foregoing description, it will be readily seen that there has been produced such a seal for flange-supported bearings as substantially fulfills the objects of the invention, as set forth herein.

While this specification sets forth in detail the present and preferred construction of the seal for flange-supported bearings, still in practice such deviations from such detail may be resorted to as do not form a departure from the spirit of the invention, as defined by the appended claims.

Having thus described the invention, the following is claimed as new and useful and upon which Letters Patent is desired:

1. In an anti-friction bearing which includes outer and inner races, and supporting means for the bearing including separate but abutting mounting plates about and projecting radially out from the outer race, and flanges projecting laterally out from the plates and engaging the outer surface of the outer race, the plates and flanges providing a circumferential cavity about the outer race of the bearing; an elastic sealing ring seated under compression in the central portion of the cavity in engagement between the outer race and the juncture of the plates, a lug integral with and projecting radially out from the ring in engagement with and enclosed between the adjacent faces of the plates radially out from said cavity, the lug having a groove in one face terminating at its outer end short of the outer end of the lug and at its inner end communicating with the cavity on one side of the ring, and a lubricant fitting mounted in one of said plates and communicating with said groove; there being a lubricant passage through the outer race and communicating with the cavity on said one side of the ring.

2. A bearing and sealing ring combination, as in claim 1, in which the lug at its radially inner end engages the outer face of the outer race; said lug being transversely grooved at said inner end and for the full width thereof whereby to provide communication between the inner end of the first named groove and the cavity on the opposite side of the ring; there being a lubricant passage through the outer race and communicating with the cavity on said opposite side of the ring.

3. A bearing and sealing ring combination, as in claim 1, in which the lug is of triangular form in a plane axially of the ring, the other face of the lug being mainly in a plane centrally of the width of the ring and at right angles to said axis and engaging against the adjacent face of the other plate, and said one face of the lug extending from an apex at the outer end of the lug in laterally outwardly sloping relation to a termination laterally out from the ring in substantial alinement with the radially inner edge of the ring; said one plate being deformed to provide a housing about and closely confining the lug.

4. In an anti-friction bearing which includes outer and inner races, and supporting means for the bearing including separate but abutting mounting plates about and projecting radially out from the outer race, and flanges projecting laterally out from the plates and engaging the outer surface of the outer race, the plates and flanges providing a circumferential cavity about the outer race of the bearing; an elastic sealing ring seated under compression in the central portion of the cavity in engagement between the outer race and the juncture of the plates, one side of the cavity being unobstructed by the sealing ring, a lubricant fitting mounted in the supporting means and feeding into said one side of the cavity, said outer race having a lubricant passage therethrough communicating with said one side of the cavity, and means formed with the ring adjacent the fitting preventing access of lubricant between the adjacent portions of the plates; said last named means comprising a lug integral with the sealing ring and projecting between said adjacent portions of the plates.

5. A bearing and sealing ring combination, as in claim 4, in which the lug has a lubricant groove therein providing communication between the fitting and the cavity.

References Cited

UNITED STATES PATENTS 3,314,735    4/1967    Kecian _____ 308—187.2

MARTIN P. SCHWADRON, *Primary Examiner.*

FRANK SUSKO, *Examiner.*